Oct. 11, 1960  E. G. PERRY  2,955,518
AERIAL CAMERA

Filed July 3, 1958  4 Sheets-Sheet 1

INVENTOR
*Edward Gordon Perry*

BY *Stevens, Davis, Miller & Mosher*
ATTORNEYS

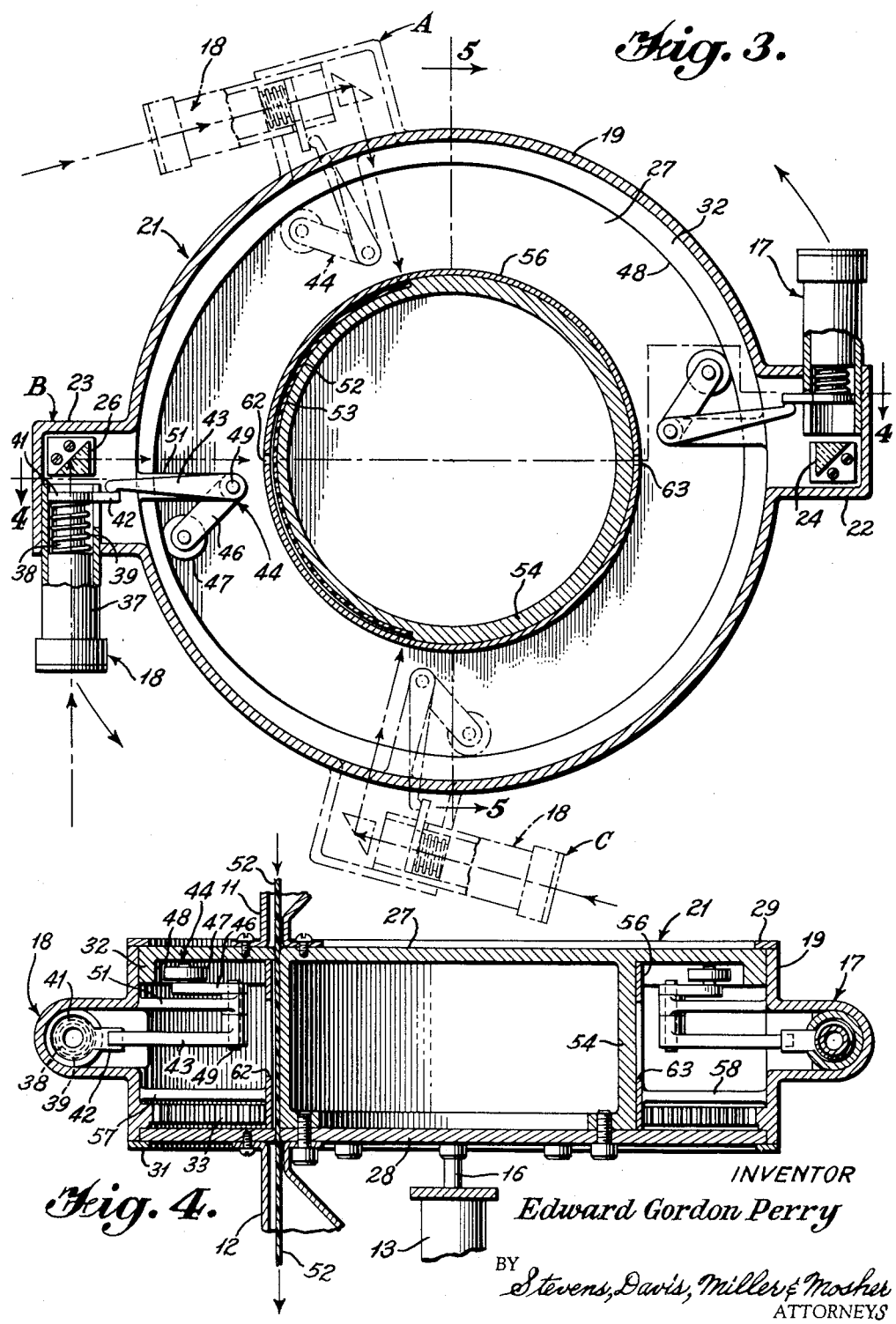

Oct. 11, 1960 E. G. PERRY 2,955,518
AERIAL CAMERA
Filed July 3, 1958 4 Sheets-Sheet 3
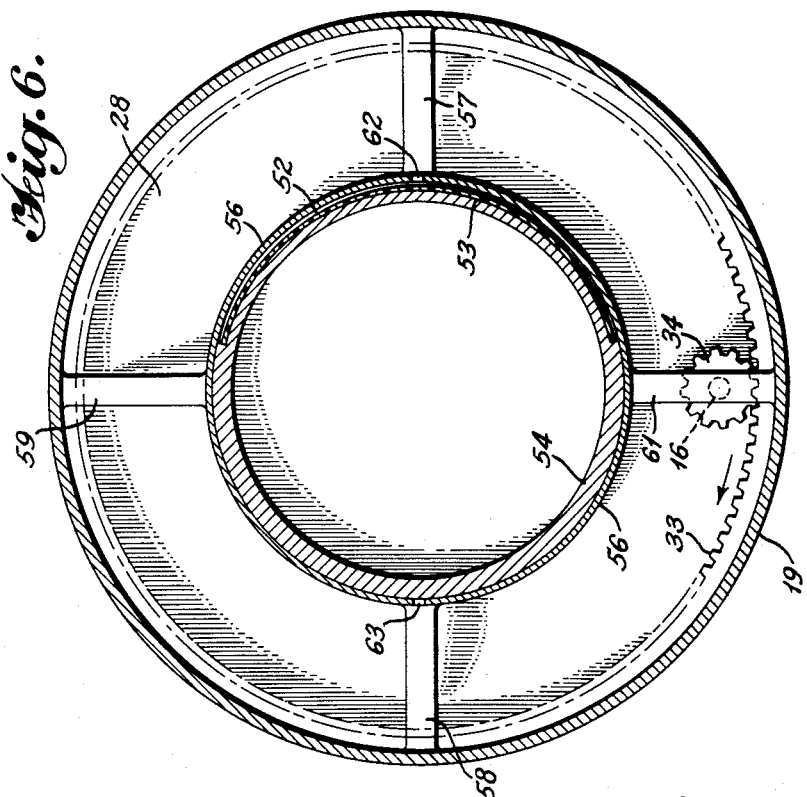
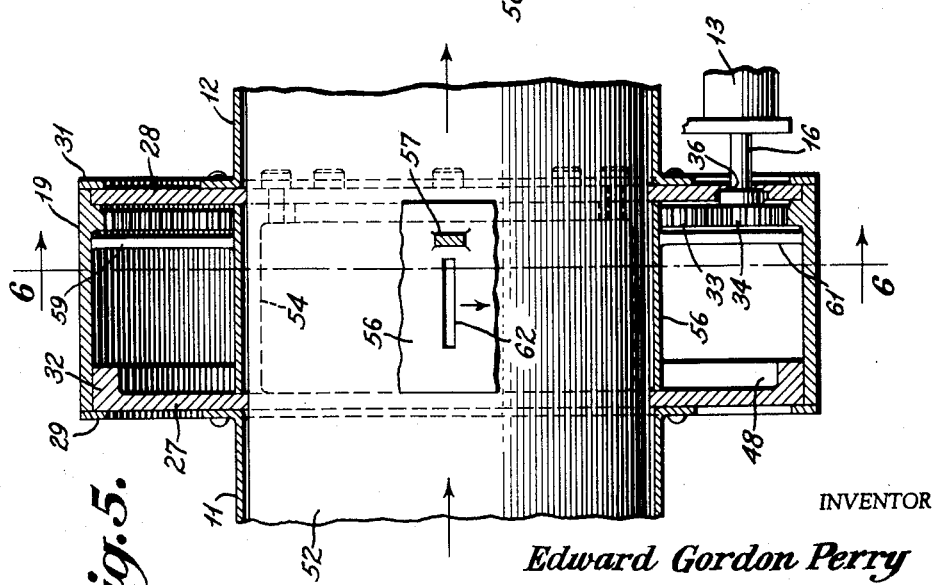
INVENTOR
Edward Gordon Perry
BY
Stevens, Davis, Miller & Mosher
ATTORNEYS Oct. 11, 1960 E. G. PERRY 2,955,518
AERIAL CAMERA
Filed July 3, 1958 4 Sheets-Sheet 4
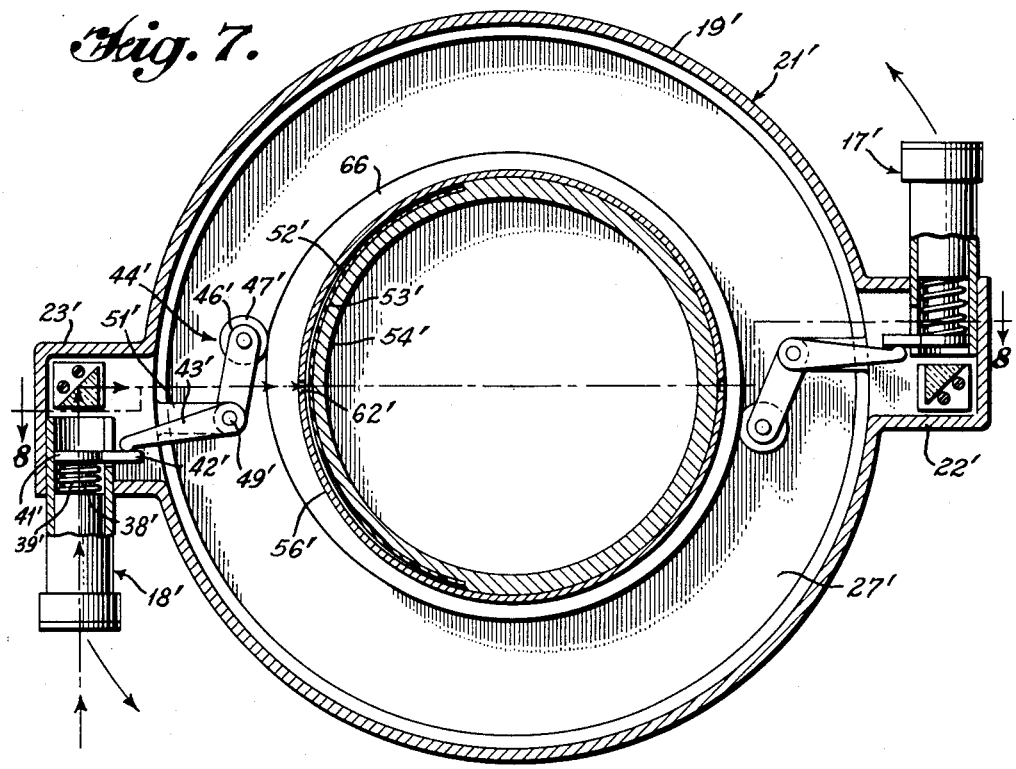
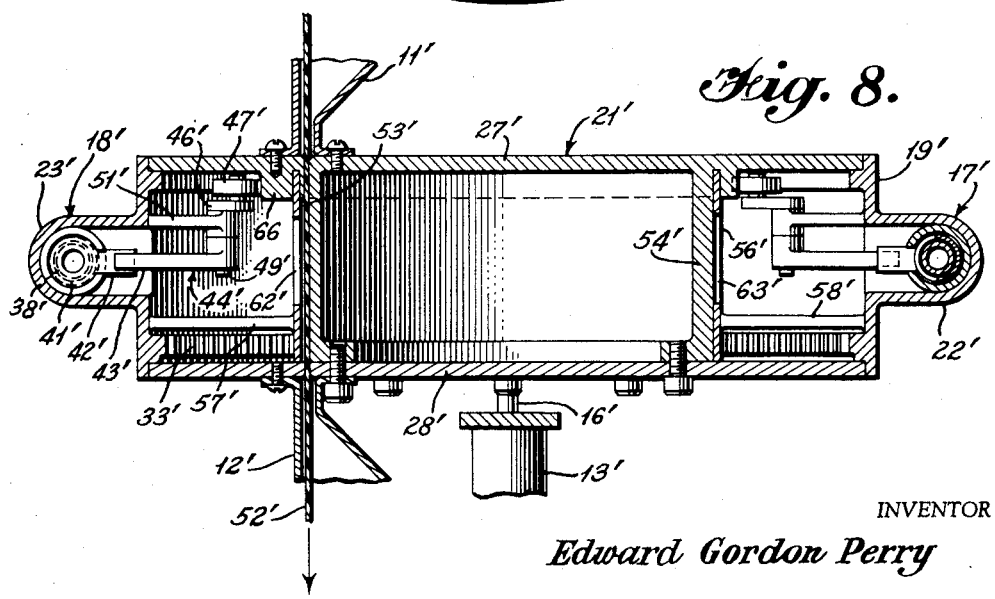
INVENTOR
Edward Gordon Perry
BY Stevens, Davis, Miller & Mosher
ATTORNEYS

United States Patent Office 2,955,518
Patented Oct. 11, 1960

2,955,518
AERIAL CAMERA

Edward Gordon Perry, Dallas, Tex., assignor to Texas Instruments Incorporated, Dallas, Tex., a corporation of Delaware Filed July 3, 1958, Ser. No. 746,465

7 Claims. (Cl. 95—12.5)

The present invention relates to an aerial camera and more particularly, to a repetitive-scanning, panoramic, aerial camera.

One of the principal problems encountered in the use of an aerial camera is the distortion introduced due to changes in the shooting angle. When photographing the ground, as from an airplane, the area photographed is dependent upon the sine of the angle formed between the camera axis and the vertical to ground. As the angle increases so does the area photographed. Thus distortion is produced in the areas photographed most remote from the camera.

Accordingly, it is an object of the present invention to provide a repetitive-scanning, panoramic, aerial camera in which distortion due to change of distance of the camera from the ground, as it is scanned through a predetermined arc, is prevented by appropriate control.

It is another object of the present invention to provide a repetitive-scanning, panoramic, aerial camera in which distortion due to variation of distance of the camera from ground, as the camera lens is scanned, is eliminated by the utilization of a zoom-type lens controlled by a cam and cam follower arrangement.

It is another object of the present invention to provide a repetitive-scanning, panoramic, aerial camera in which two sets of diametrically-opposed lenses are rotated about an axis parallel to the direction of flight of the aircraft and thereby repetitively scan and photograph strips of ground disposed transversely to the direction of flight of the aircraft.

It is another object of the present invention to provide a repetitive-scanning, panoramic, aerial camera employing lens systems which rotate about an axis parallel to the longitudinal axis of the aircraft in which the camera is carried and in which film is intermittently or continuously advanced parallel to the longitudinal axis of the aircraft so that strips of ground which are transverse to the axis of the aircraft are successively recorded on the film and produce a continuous picture of the terrain.

The above and still further objects, features and advantages of the present invention will become apparent upon consideration of the following detailed description of two specific embodiments thereof, especially when taken in conjunction with the accompanying drawings, wherein:

Figure 3 is a cross-sectional view of one embodiment of the present invention taken along a transverse center plane of the camera;

Figure 4 is a cross-sectional view taken along line 4—4 of Figure 3;

Figure 5 is a cross-sectional view taken along line 5—5 of Figure 3;

Figure 6 is a cross-sectional view taken along line 6—6 of Figure 5;

Figure 7 is a cross-sectional view of a second embodiment of the present invention taken along a transverse central plane of the camera; and Figure 8 is a cross-sectional view taken along line 8—8 of Figure 7 of the present invention.

Figure 1:
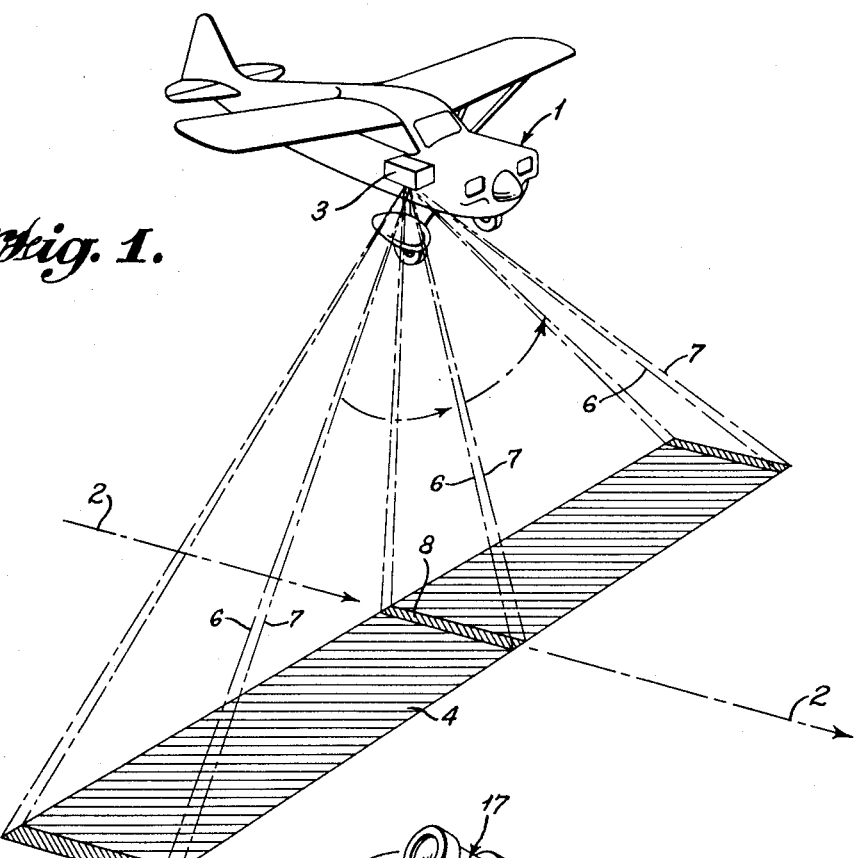
Figure 1 is a diagrammatic view of an aircraft and the field of view photographed by the camera of the present invention.

Referring specifically to Figure 1 of the accompanying drawings, there is illustrated an airplane, generally designated by the reference numeral 1, flying a course indicated by the broken lines 2. Mounted on the aircraft 1 is an aerial camera 3 which is adapted to scan a strip of ground 4 lying transverse to the direction of travel or course of the craft. The camera 3, in order to produce a clear continuous record of the terrain traversed, must be capable of achieving two basic functions. The first function is that the composite of the successive strips 4 must make a complete picture, with no gaps or substantial overlap between the strips of terrain successively scanned by the camera. This function is achieved by insuring that the scanning of the camera occurs at a rate such that successive strips partially overlap one another. In forming the final picture the overlapping portions may be eliminated.

The second function which must be achieved by the aerial camera 3 is that as the lens system investigates areas of increasing distance from the aircraft, the focal length of the lens is varied to avoid the occurrence of distortion. Assuming that at any instant the region photographed by the camera 3 is included within an angle defined by lines 6—7 of Figure 1, then if the angle 6—7 remains constant throughout each scan of a strip 4, it is apparent that the segment 8, which lies directly under the aircraft, is smaller than a segment 9 lying at a distance defined by a large angle, for instance 45°, from the aircraft. If correction for the variation of area investigated with the angle of the lens to the ground is not made, objects lying at the distance designated by the segment 9 would appear considerably smaller than objects the same size lying in the segment 8. This tendency toward distortion is avoided by the camera of the invention which includes means to compensate for this distortion in order to provide an accurate picture of the scene being investigated.

Figure 2:
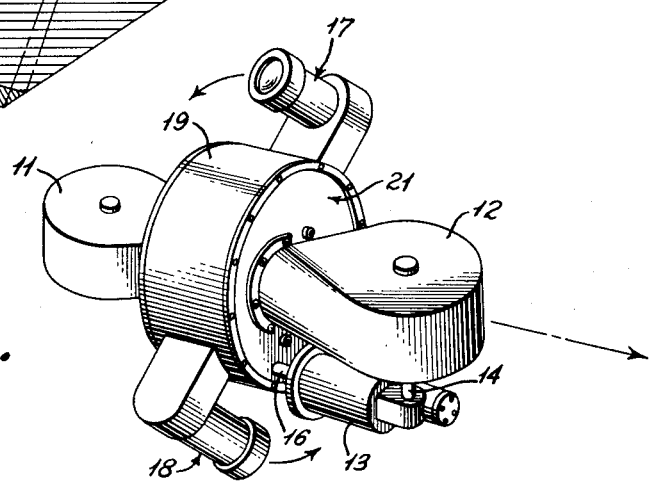
Figure 2 is a perspective view of the exterior of the camera of the present invention.

Referring to Figure 2 of the accompanying drawings, there is illustrated a perspective view of the exterior of the camera of the present invention. The camera is provided with a film supply spool (not illustrated) enclosed within a can 11 and a film take-up spool (not illustrated) enclosed within a can 12. The apparatus is actuated by a drive member 13 which may be an electric motor or any other suitable drive means to operate the film advance and take-up mechanism via a shaft 14 and to effect scanning motion of the camera via a shaft 16. In consequence of the utilization of a common drive means for film advance and scanning, the entire system may be readily synchronized. The camera is provided with two lens systems 17 and 18, which are secured to a hollow cylindrical sleeve 19 adapted to be rotated about a drum 21 by means which will become apparent subsequently. The axis of the sleeve 19 is parallel to the direction of flight 2 of the aircraft, so that upon rotation of the sleeve 19, and therefore, of the lenses 17 and 18, the lenses are rotated in a plane transverse to the direction of movement of the aircraft and scan a strip 4 as viewed in Figure 1.

Referring now to Figures 3 through 6 of the accompanying drawing for a detailed showing of the apparatus, the sleeve 19 is provided with two upwardly-extending housings 22 and 23 at generally diametrically opposed locations about the sleeve 19. Actually, the center lines of a first prism 24 mounted in the outer region of the extension 22 behind the lens system 17 and a second prism 26 mounted in the outer region of the extension 23 behind the lens system 18 are diametrically opposed. The lens system 17 extends counterclockwise, as viewed in Figure 3, from the housing 22 through an aperture therein while the lens system 18 extends in a counterclockwise direction through a suitable aperture in the housing 23. The center lines of the lens systems 17 and 18 are perpendicular to the center line of the system passing through the centers of the prisms 24 and 26 so that the optical images entering the lenses 17 and 18 are turned at right angles by the prisms 24 and 26, respectively, and directed along a diameter of the sleeve 19 toward its center.

The sleeve 19 is supported on the outer edges of side walls 27 and 28 of the drum 21; sideways movement of the sleeve 19 being prevented by circular flanges 29 and 31 which extend radially inwardly from the sleeve 19. The wall 27 may be provided with an inwardly directed flange 32 disposed at right angles to the wall 27 so as to provide a low friction bearing surface for the sleeve 19 and a cam surface, as will become apparent subsequently. The sleeve 19 is provided on its inner surface with an internal circumferential gear 33 which meshes with a spider gear 34 secured to the drive shaft 16 of the motor 13. The shaft 16 is supported in a suitable aperture 36 in the wall 28 of the drum 21 and when the shaft 16 is rotated, thereby rotating the gear 34, the sleeve 19 is rotated about the drum 21 due to engagement between the gear 34 and the internal circumferential gear 33.

As previously indicated, the focusing of the lenses 17 and 18 must be varied in accordance with the angular position of the lens with respect to the ground. In order to provide for variation of the focus of the lens systems as a function of their position with respect to ground, there is provided a cam and cam follower arrangement for operating a zoom-lens type apparatus disposed within each of the lens systems 17 and 18. More specifically, the lens systems 17 and 18 (and reference is now made to the lens system 18, since both systems are identical), are each provided with a fixed outer sleeve 37 in which is supported at the lower end thereof, as viewed in Figure 3, a fixed lens (not illustrated); the sleeve 37 being fixedly secured to the housing 23 of the sleeve 19. Disposed internally of the sleeve 37 is a movable hollow cylinder 38 which is biased by a spring 39 to its uppermost position, as viewed in Figure 3; the spring 39 contacting a cylindrical shoulder 41 secured to the upper end of the sleeve 38. The cylinder 38 carries a second lens of the lens system and movement of this lens is adapted to vary the focal length of the optical system continuously as a function of movement of the cylinder 38.

The circular shoulder 41 has a downwardly-depending finger 42 which is adapted to be engaged by an arm 43 of a bell-crank generally designated by the reference numeral 44. The bell-crank 44 further comprises a second arm 46 having at one end a roller 47 which is adapted to engage the inner circumferential surface 48 of the flange 32 of the side wall 27. The inner circumferential surface of the flange 32 constitutes a cam surface which is formed by varying the thickness of the flange 32. The bell-crank 44 is rigidly supported on a pin or shaft 49 which is rotatably mounted at one end of an arm 51 which extends inwardly from and is secured to the inner circumference of the sleeve 19. Thus, as the sleeve 19 rotates about the drum 21, the bell-crank 44 is oscillated about the pin 49 as a result of the roller 47 contacting portions of the cam surface 48 having different radial distances from the center of the apparatus, as will be explained in greater detail subsequently.

Film 52 supplied from the canister 11 enters the drum 21 through an appropriate arcuate aperture in the wall 27, passes through the drum 21, through a suitable arcuate aperture in the wall 28 and passes to the spool contained within the canister 12. The film is curved transversely to its direction of movement along an arc having a center of curvature which coincides with the center of the drum 21. The film 52 is supported in a recess 53 in the surface of a hollow cylinder 54 extending inwardly from the wall 27 of the drum 21 and having a center coincident with the center of the drum. The recessed surface 52 of the drum 54 may have a coating of low friction material so that the film is not scratched or damaged due to passage thereover.

Disposed about the hollow cylinder 54 is a hollow sleeve 56 which is supported by a spider arrangement comprising arms 57, 58, 59 and 61 which are secured to and extend inwardly from the inner surface of the sleeve 19. In consequence, the sleeve 56 rotates with the sleeve 19 and maintains a predetermined position with respect to the rotating lens systems 17 and 18. The sleeve 56 is provided with two rectangular apertures 62 and 63 which define very narrow openings in the direction of movement of the sleeve 56 and a relatively wide opening in a direction transverse to the direction of movement of the sleeve 56. The apertures 62 and 63 define the width of each scan and in addition provide the required narrow beam scan over the film that is necessary to prevent blurring of the picture.

Proceeding now to the operation of the apparatus, it is first noted that the arc of film 52 is less than 180° in extent and since lens systems 17 and 18, and specifically their prisms 24 and 26, are displaced by 180°, there is a predetermined small length of time available for moving the film 52, if an intermittent motion is to be employed, between the end of the scan by one of the optical systems and the beginning of the scan of the film by the other optical system. Upon energization of the motor 13, the sleeves 19 and 56 and the bell-crank 44 rotate as a unit about the center of the drum 21. Assuming for the moment that the lens system 18 is at the dotted line position A of Figure 3, the lens of the optical system 18 which is rotating counterclockwise is just coming into a position where light from the prism begins to fall on the film 52. It will be noted that in this position the spring 39 is compressed to place the lens carried by the sleeve 38 into a first position. The light from the prism 26 is directed on a narrow portion of the film perpendicular to the direction of movement of the light and extends across a predetermined width of the film. This narrow beam of optical information is moved transversely to the direction of movement of the film as the lens system 18 continues to rotate and therefore, scans a predetermined width of the film 52 as it moves from position A, to the full line position B and then to the second dotted line position C at which location the scan of the film terminates.

As the optical system 18 moves from position A to position B, the roller 47 moves over the surface of the cam 48 which in this region increases in diameter. Therefore, the arm 43 of the bell crank 44 is rotated clockwise about the shaft 49 and the spring 39 is permitted to expand and move the sleeve 38 outwardly toward the prism 26, thereby gradually changing the focal length of the optical system. When the lens is directed vertically downward, the necessary change in the system from narrow angle scan at position A to the wide angle scan at position B is effected. As the lens system 18 passes through its vertical position and proceeds toward position C, the roller 47 encounters a region of the surface of the cam 48 of decreasing diameter. When the lens system attains the position C, the system is fully restored to the condition it was in when at position A. This is desirable since the angles between the lens and the vertical in positions A and C are equal. Immediately after the image developed by the optical system 18 leaves the film 52, which occurs at a time when the image developed by the optical system 17 is not yet directed onto the film 52, the film may be moved so as to present an unexposed strip of film to the camera and optical system 17.

The prisms 24 and 26 may be replaced by mirrors.

Either a prism or a mirror is desired to prevent blurring of the picture as scanning of the picture across the film occurs. Blurring of the image is prevented since the motion of the image produced by movement of the lens is reversed by reflection from the prism or mirror and therefore, the lens motion is cancelled and the image presented to the film appears to be stationary. The variation in focal length accomplished by the utilization of zoom lenses in the optical systems 17 and 18 must be such that the objects of equal size produce images of equal size on the film regardless of their distance from the vertical. As previously indicated, if the angle 6—7 investigated by the camera remains constant across the strip 4 of Figure 1, then the segments 8 and 9 are of different sizes. However, by changing the focal length of the lens system the angle 6—7 is varied so that the segments 8, 9 are always of the same size. As an indication of the changes which can be accommodated by conventional zoom lens systems, such a lens system readily produces focal length changes of 4 to 1. This means that an angle of 150° can be scanned on the ground and provides a strip 4 transverse to the direction of travel of the plane having a length approximately seven and a half times the plane's altitude.

Variations of the system disclosed will be apparent from this disclosure. For example, if the aircraft employed is a relatively slow flying craft, only a single optical system need be employed. Thus, one of the lens systems 17 or 18 may be omitted. However, where a high speed aircraft is utilized, two or more lens systems may be required. A further change which may be effected is that by providing one additional reflecting surface, continuous movement of the film may be employed rather than frame by frame advance, in which case, the film may be scanned through 180°.

In the embodiment illustrated in Figures 3 through 6, an internal cam has been employed to control the zoom lens 20. It is not intended to limit the apparatus of the present invention to a specific cam arrangement and in a second embodiment of the invention, illustrated in Figures 7 and 8, an external cam is employed. The reference numerals in Figures 7 and 8 which refer to parts also employed in the first embodiment of the invention carry the same reference numerals with primes.

Referring now specifically to Figures 7 and 8, two optical systems 17' and 18' are disposed within housings 22' and 23' extending outwardly from a hollow sleeve 19' at generally diametrically opposed locations thereof. The sleeve 19' is supported on the outer circumferential edges of two side walls 27' and 28' of a drum 21' and is provided with an internal ring gear 33' which is adapted to be rotated by a spider gear (not illustrated) carried on the end of the shaft 16' of a motor 13'. The lens systems 17' and 18' are identical with those illustrated in Figures 3 and 4 and include an internal slidable sleeve 38' carrying a lens (not illustrated) and biased to an upward position, as illustrated in Figure 7 of the accompanying drawings, by means of a spring 39' which engages a collar 41' secured to the upper part of the sleeve 38'. The shoulder 41' is provided with an inwardly extending finger 42' which is engaged by an arm 43' of a bell-crank 44'. The bell-crank 44' constitutes a second arm 46' which carries a roller 47' on the end thereof. The bell-crank is supported on a pin or shaft 49' which is rotatably carried on a radial arm 51' secured to the inner surface of the ring 19'. The only distinction between the bell-crank 44' of Figures 7 and 8 and that of the bell-crank 44 of the first embodiment of the invention is the angle between the arms 43' and 46'. In the first embodiment of the invention the angle formed by these two arms is an acute angle so that the roller 47 is disposed against an internal cam 48 while in the embodiment of the invention illustrated in Figures 7 and 8 the angle between the arms 42' and 46' is an obtuse angle so that the roller 47' contacts an external cam 66 formed as an inwardly-directed circumferential extension from the side wall 27' of the drum 21'. Effectively then, the only distinction between the use of an internal and an external cam is the position of the cam on the side wall 27 or 27' of the drum 21 or 21', respectively. In the first embodiment of the invention the external surface of the cam 48 forms a bearing surface for the sleeve 19 and the internal surface is exposed and employed as the cam surface. In the second embodiment of the invention, the inwardly directed member is moved radially inward along the wall 27' so that the external surface of this circumferential shoulder is available as a cam surface and the internal surface is employed as a further guide for a rotating sleeve 56' having scanning slit 62' formed therein. The scanning sleeve 56' is supported on four arms, only two of which are illustrated, these being the arms 57' and 58', which are secured to the inner surface of the rotating sleeve 19'. The sleeve rotates about a cylinder 54' which is directed inwardly from the side wall 27'. The member 54' is recessed as at 53' to provide a region for the film 52'.

It is apparent that in all essential details the operation of the second embodiment of the invention is identical to the operation of the first embodiment of the invention and provides for successive scanning of a strip of film which is moving longitudinally, for example, parallel to the axis of the aircraft.

Although the invention has been described and illustrated in terms of two specific embodiments, it will be clear that variations of the details of construction which are specifically illustrated and described may be resorted to without departing from the true spirit and scope of the invention as defined in the appended claims.

What is claimed is:

1. A scanning camera comprising at least one variable focal length lens system, means for moving a film through said camera along a predetermined path, means for curving said film about an arc transverse to the direction of travel of the film, means for rotating said variable focal length lens about the center of the arc of the film, means for varying the focal length of said variable focal length lens system in accordance with its position in regard to the arc of the film, an optical scanning apparatus comprising light confining means located between said lens system and said film for confining light transmitted through said lens system to a relatively narrow segment of said film, means for rotating said optical scanning apparatus with said lens system about an axis coinciding with the center of the arc of the film, and a light deflecting means for directing the light proceeding through said lens system through said light confining means and toward the center of rotation of said lens system.

2. A scanning camera comprising at least one variable focal length lens system, means for moving a film through said camera along a predetermined path, means for curving said film about an arc transverse to the direction of travel of the film, means for rotating said lens system about the center of the arc of the film, an optical scanning apparatus defining an aperture having a small dimension in the direction of rotation of said lens system, means for rotating said optical scanning apparatus with said lens system and a light deflecting means for directing the light proceeding through said lens system through said aperture and toward the center of rotation of said lens system, a stationary cam having a center coincident with the center of rotation of said lens system, a cam follower rotatable with said lens system and means for coupling said cam follower to said lens system to vary the focal length thereof in accordance with its position relative to said cam.

3. The combination according to claim 2, further comprising a second variable focal length lens system spaced from said aforementioned lens system, means for constraining said second lens system to rotate with said first-mentioned lens system, a second aperture in said scanning apparatus, a second light deflecting means for deflecting light from said second lens system toward the center of rotation of said lens system, a second cam follower arranged to engage said cam and displaced from said first-mentioned cam follower by an angle approximately equal to the angle between said lens systems and means for coupling said second cam follower to said second lens system to vary the focal length thereof in accordance with its position relative to said cam.

4. A scanning aerial camera adapted to be mounted in an aircraft such that movement of the film is parallel to the direction of movement of the aircraft, said camera comprising a curved platten, means for guiding the film over the curved platten to bend the film into an arc perpendicular to its direction of movement, a variable focal length lens system, a light deflector for directing light from said lens system toward the center of the curved platten along a radius thereof, means for rotating said lens system about the center of the curved platten, an optical scanning apparatus disposed between said platten and said lens system and rotatable with said lens system to maintain a predetermined position thereto, said optical scanning apparatus having a narrow slit arranged along a radius between the center of said platten and said light deflector, a circular cam having its center of curvature coincident with the center of curvature of said platten, a cam follower rotatable with said lens system, and means for coupling said cam follower to said lens system to vary the focal length thereof in accordance with the position of said lens system relative to the circumference of said cam.

5. A scanning aerial camera adapted to be mounted in an aircraft such that movement of the film is parallel to the direction of movement of the aircraft, said camera comprising a curved platten, means for guiding the film on the curved platten to bend the film into an arc perpendicular to its direction of movement, a variable focal length lens system rotatable about the film, a light deflector for directing light from said lens system toward the center of the curved platten along a radius thereof, means for rotating said lens system about the center of the curved platten, an optical scanning apparatus disposed between said platten and said lens system and rotatable with said lens system, said optical scanning apparatus having a narrow slit arranged along the radius between the center of said platten and said light deflector, a circular cam having its center of curvature coincident with the center of curvature of said platten, a cam follower rotatable with said lens system, said lens system having movable mechanical means for varying the focal length thereof and a lever interconnecting said cam follower and said mechanical means.

6. A scanning aerial camera adapted to be mounted in an aircraft such that movement of the film is parallel to the direction of movement of the aircraft, said camera comprising a curved platten, means for guiding the film over the curved platten so as to bend the film into an arc perpendicular to its direction of movement, a variable focal length lens system, a light deflector for directing light from said lens system toward the center of the curved platten along a radius thereof, means for rotating said lens system about the center of the curved platten, an optical scanning apparatus disposed between said platten and said lens system and rotatable with said lens system, said optical scanning apparatus having a narrow slit arranged along the radius between the center of said platten and said light deflector, a circular internal cam having its center of curvature coincident with the center of curvature of said platten, a cam follower rotatable with said lens system, and means for coupling said cam follower to said lens system to vary the focal length thereof in accordance with the position of said lens system relative to the circumference of said cam.

7. A scanning aerial camera adapted to be mounted in an aircraft such that movement of the film is parallel to the direction of movement of the aircraft, said camera comprising a curved platten, means for guiding the film over the curved platten to bend the film into an arc perpendicular to its direction of movement, a variable focal length lens system, a light deflector for directing light from said lens system toward the center of the curved platten along a radius thereof, means for rotating said lens system about the center of the curved platten, an optical scanning apparatus disposed between said platten and said lens system and rotatable with said lens system, said optical scanning apparatus having a narrow slit arranged along the radius between the center of said platten and said light deflector, a circular external cam having its center of curvature coincident with the center of curvature of said platten, a cam follower rotatable with said lens system to vary the focal length thereof in accordance with the position of said lens system relative to the circumference of said cam.

References Cited in the file of this patent

UNITED STATES PATENTS

| | | |
|---|---|---|
| 1,136,761 | Becker | Apr. 20, 1915 |
| 1,836,584 | Elms | Dec. 15, 1931 |
| 2,456,317 | Rabinow | Dec. 14, 1948 |
| 2,815,701 | Back et al. | Dec. 10, 1957 |